United States Patent [19]
Chen

[11] Patent Number: 5,579,872
[45] Date of Patent: Dec. 3, 1996

[54] BICYCLE BRAKE DEVICE

[76] Inventor: Tsung-I Chen, 58, Ma Yuan West St., Taichung, Taiwan

[21] Appl. No.: 554,963

[22] Filed: Nov. 13, 1995

[51] Int. Cl.⁶ ....................................................... B62L 1/06
[52] U.S. Cl. ................... 188/24.16; 188/2 D; 74/471 R; 74/502.6; 74/489
[58] Field of Search ................................ 188/2 D, 24.11, 188/24.14, 24.12, 24.15, 24.16, 24.22; 74/500.5, 501.6, 502.6, 471 R, 473 R, 479 R, 479 M, 479 ML, 479 MM

[56] References Cited

U.S. PATENT DOCUMENTS

| 1,666,390 | 4/1928 | Marley | 188/2 D |
| 4,480,720 | 11/1984 | Shimano | 188/2 D X |
| 4,773,510 | 9/1988 | Sato | 188/2 D X |

*Primary Examiner*—Lee W. Young

[57] ABSTRACT

A bicycle brake device comprises a rotating device, a rotating shaft and a pair of pintles. Two recesses are formed on the rotating device to receive the heads of the front and rear brake lines, respectively. The rotating device has two chambers defined by two corresponding flanges of the rotating device. The first and second pintles are on the corresponding chambers, respectively. Each pintle has a slot and a circular hole at each of a top end and a bottom end of the pintle. The bottom circular hole receives hollow cylinder post. A hollow screw which has a through hole passes through the bottom slot and the hollow cylinder post. The first and second brake control lines pass through the corresponding through holes, respectively. One end of the first or second brake control line is positioned by the positioning hole of the screw bolt. The screw bolt passes through a washer, a nut, and the through hole. The springs are disposed between the corresponding pintles and the rotor.

1 Claim, 2 Drawing Sheets

BICYCLE BRAKE DEVICE

BACKGROUND OF THE INVENTION

The invention relates to a bicycle brake. More particularly, the invention relates to a bicycle brake device which can use a single lever to brake the front brake and the rear brake.

A conventional bicycle brake device has to apply the left lever and the right lever in order to brake the front brake and the rear brake simultaneously.

SUMMARY OF THE INVENTION

An object of the invention is to provide a bicycle brake device which can brake the front brake and the rear brake simultaneously with a single lever.

Accordingly, a bicycle brake device comprises a rotating shaft, a rotating device and a pair of pintles. The first recess is formed on the rotating device to receive the front head of the front brake line. The second recess is formed on the rotating device to receive the rear head of the rear brake line. The rotating device has two chambers defined by two corresponding flanges. The first and second pintles are disposed on the corresponding chambers, respectively. Each pintle has a slot and a circular hole at each of a top end and a bottom end of the pintle, respectively. The bottom circular hole receives a hollow cylinder post. A hollow screw which has a through hole passes through the bottom slot and the hollow cylinder post. The first and second brake control lines pass through the corresponding through holes, respectively. One end of the first or second brake control line is positioned by the positioning hole of the screw bolt. The screw bolt passes through a washer, a nut, and the through hole. The springs are disposed between the corresponding pintles and the rotor, respectively, to direct the pintles to move toward the corresponding flanges which has a center hole to be passed by a rotating shaft.

DETAILED DESCRIPTION OF THE INVENTION

Figure 1:
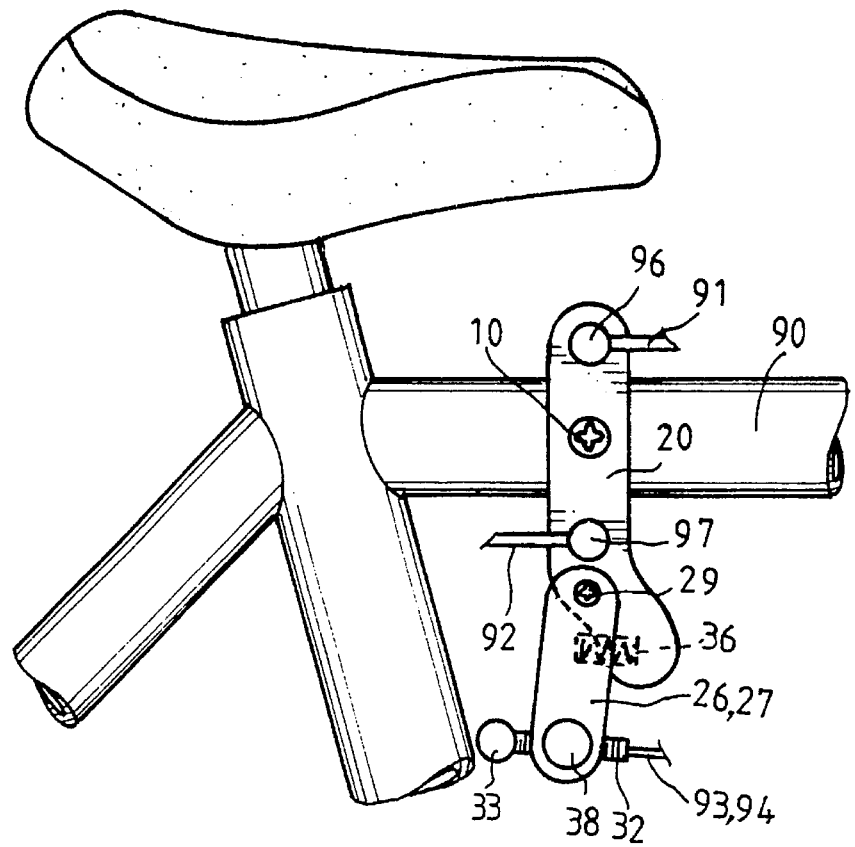
FIG. 1 is a schematic view of mounting a bicycle brake device on a bicycle in accordance with the invention.
Figure 2:
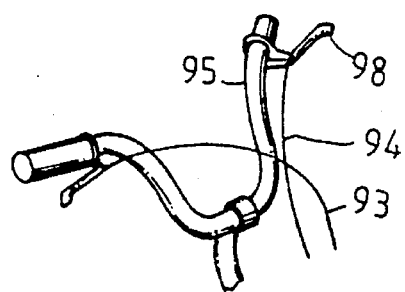
FIG. 2 is a partly perspective view of a bicycle handle.
Figure 3:
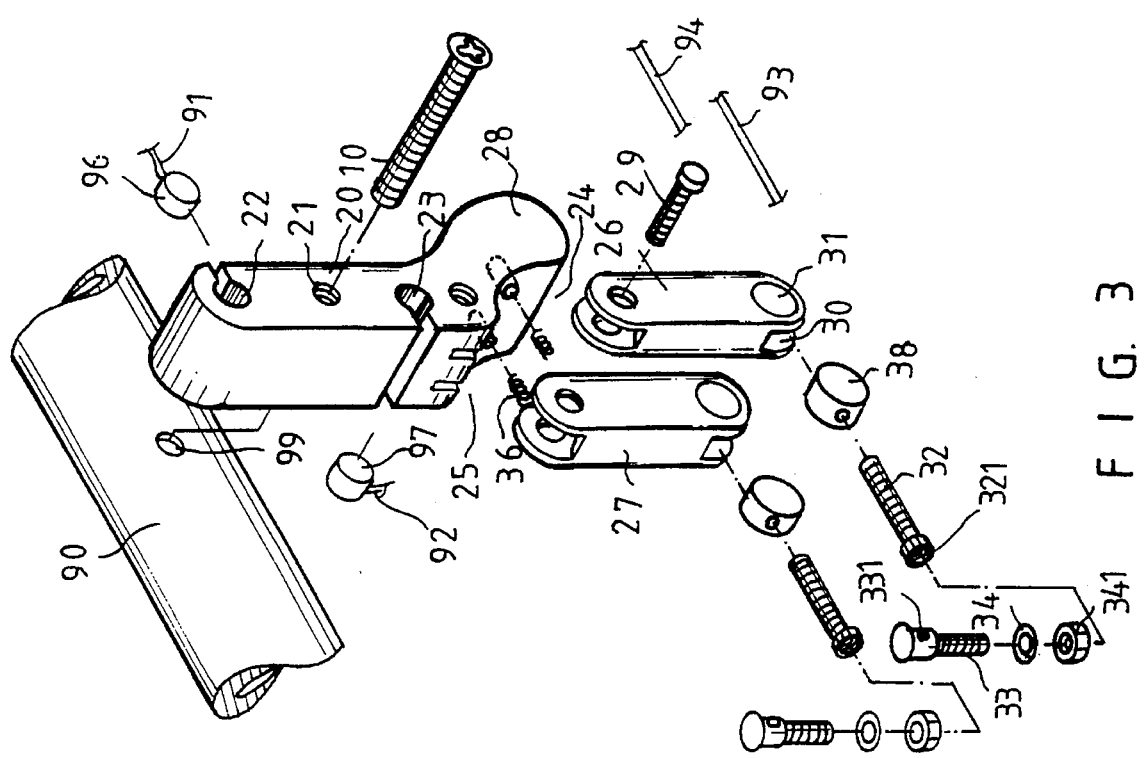
FIG. 3 is a perspective exploded view of a bicycle brake device.

Referring to FIG. 3, the invention provides a bicycle brake device which comprises a rotating shaft 10, a rotating device 20 and a pair of pintles 26 and 27. Referring to FIGS. 1 to 3, the first recess 22 is formed on the rotating device 20 to receive the front head 96 of the front brake line 91. The second recess 23 is formed on the rotor 20 to receive the rear head 97 of the rear brake line 92. Thus the heads 96 and 97 can rotate with the rotating device 20 simultaneously. The rotating device 20 has two chambers 24 and 25 defined by two corresponding flanges of the rotating device 20. The first and second pintles 26 and 27 are disposed on the corresponding chambers 24 and 25, respectively. Each pintle 26 or 27 has a slot 30 and a bottom circular hole 31 at each of a top end and a bottom end of the pintle 26 or 27, respectively. The bottom circular hole 31 receives a hollow cylinder post 38. A hollow screw 32 which has a through hole 321 passes through the bottom slot 30 and the hollow cylinder post 38 so that the hollow screws 32 can rotate with the cylinder post 38. The first and second brake control lines 93 and 94 pass through the corresponding through holes 321, respectively. One end of the first or second brake control line 93 or 94 is positioned by the positioning hole 331 of the screw bolt 33. The screw bolt 33 passes through a washer 34, a nut 341, and the through hole 321. The springs 36 are disposed between the corresponding pintles 26 and 27 and the rotating device 20, respectively, to direct the pintles 26 and 27 to move toward the corresponding flanges 28 which has a center hole to be passed by a rotating shaft 10 and a hole 99 of a frame 90 is passed by a rotating shaft 10 so that the rotor 20 is connected to the frame 90 of a bicycle via the rotating shaft 10. A pintle screw 29 passes through the corresponding pintle 26 or 27 to position the pintle 26 or 27. The flanges 28 can block the corresponding plates 26 and 27, respectively. When the left lever 98 is grasped toward the left handle 95, the rotating device 20 is rotated and the second pintle 27 is operated. The first pintle 26 is released by the spring 36 to leave the flange 28.

The invention is not limited to the above embodiment but various modification thereof may be made. It will be understood by those skilled in the art that various changes in form and detail may be made without departing from the scope of the invention.

I claim:

1. A bicycle brake device comprising:

a rotating device;

a first recess formed on said rotating device to receive a front head of a front brake line;

a second recess formed on said rotating device to receive a rear head of a rear brake line;

said rotating device having two chambers defined by two corresponding flanges of said rotating device;

a first and second pintles disposed on said corresponding chambers, respectively;

each of said pintle having a slot and a bottom circular hole at each of a top end and a bottom end of said pintle;

said bottom circular hole of said pintle receiving a hollow cylinder post;

a hollow screw which has a through hole passing through said bottom slot of said pintle and said hollow cylinder post;

a first and second brake control lines passing through said corresponding through holes, respectively;

one end of each of said brake control lines positioned by a positioning hole of a screw bolt;

said screw bolt passing through a washer, a nut, and said through hole;

two springs disposed between said corresponding pintles and said rotating device, respectively, to direct said pintles to move toward each of said corresponding flange which has a center hole to be passed by a rotating shaft.

* * * * *